Nov. 7, 1944.  R. C. SHOEMAKER  2,362,220
TRACTOR MOUNTED CRANE
Filed May 12, 1942  4 Sheets-Sheet 1

ROBERT C. SHOEMAKER
INVENTOR

ATTORNEY

Nov. 7, 1944.　　R. C. SHOEMAKER　　2,362,220
TRACTOR MOUNTED CRANE
Filed May 12, 1942　　4 Sheets-Sheet 2

ROBERT C. SHOEMAKER
INVENTOR

ATTORNEY

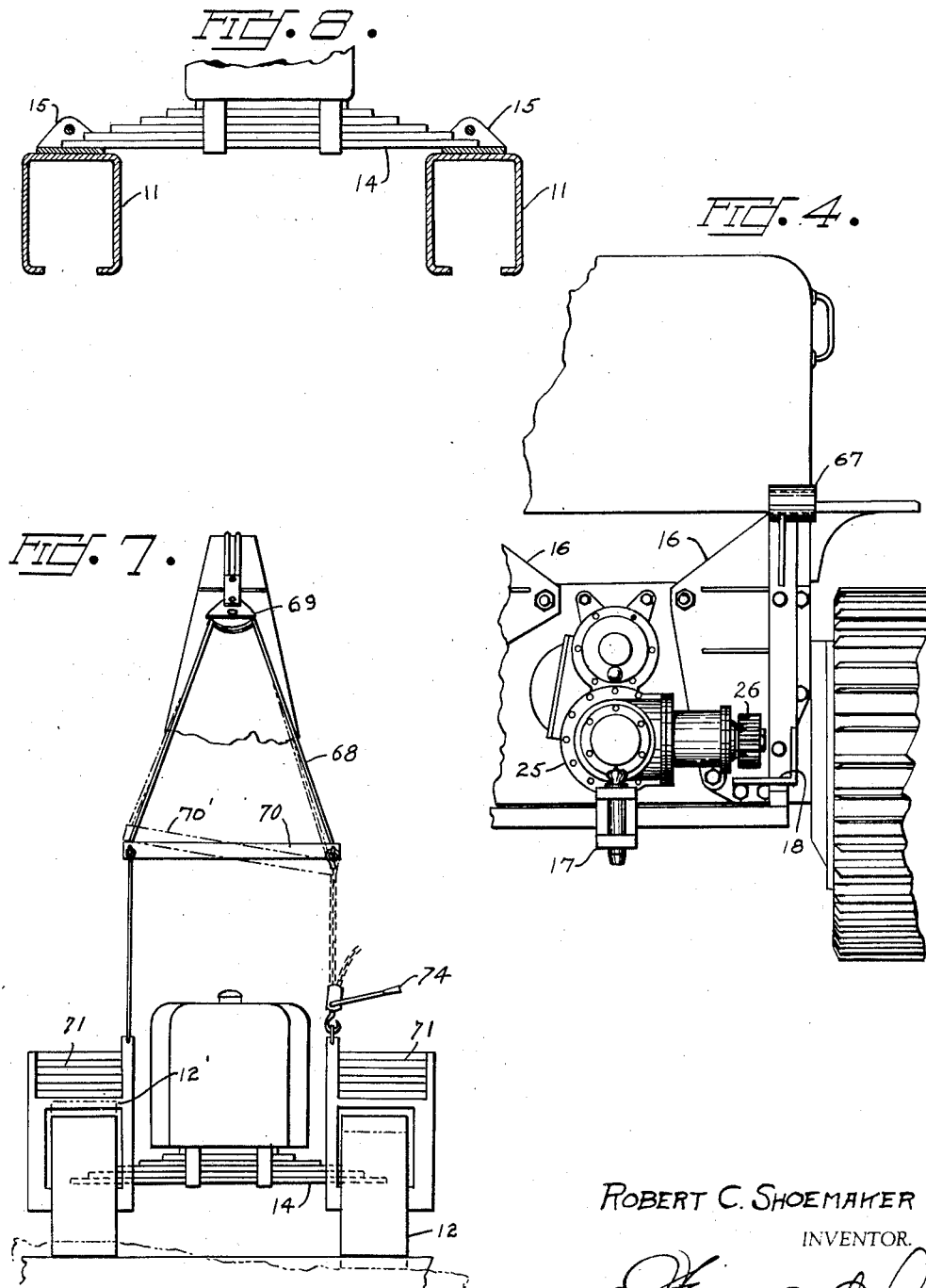

Nov. 7, 1944.   R. C. SHOEMAKER   2,362,220
TRACTOR MOUNTED CRANE
Filed May 12, 1942   4 Sheets-Sheet 4

ROBERT C. SHOEMAKER
INVENTOR
ATTORNEY

Patented Nov. 7, 1944

2,362,220

UNITED STATES PATENT OFFICE 2,362,220

TRACTOR MOUNTED CRANE

Robert C. Shoemaker, Portland, Oreg., assignor to Willamette Hyster Company, Portland, Oreg., a corporation of Oregon Application May 12, 1942, Serial No. 442,614

22 Claims. (Cl. 212—8)

This invention relates to a demountable crane for a conventional track-type tractor, and has particular reference to a construction and arrangement of parts for detachably mounting a crane or power shovel on a tractor.

It is an object of the invention to provide for detachably mounting a crane, power shovel or like equipment on a conventional spring-suspended track-type tractor without in any particular impairing tractor maneuverability or utility for other fields of operation.

It is a further object of the invention to provide a crane structure detachably mounted on a track-type tractor and which is so constructed as to be readily and quickly assembled or disassembled relative to the tractor.

It is a further object of the invention to provide for adjusting the axis of rotation of a tractor mounted swing type crane to compensate for declination of said axis from the vertical by reason either of the load on the crane or unevenness of track support.

It is a further object of the invention to provide for so mounting a crane on a spring-suspended track-type tractor that stresses imparted by loads on the crane tend to load the spring in the proper direction.

Additional objects and advantages of the invention will appear from the following description, taken in connection with the accompanying drawings, while features of novelty characterizing the invention will be set forth in the claims appended hereto.

Figure 1:
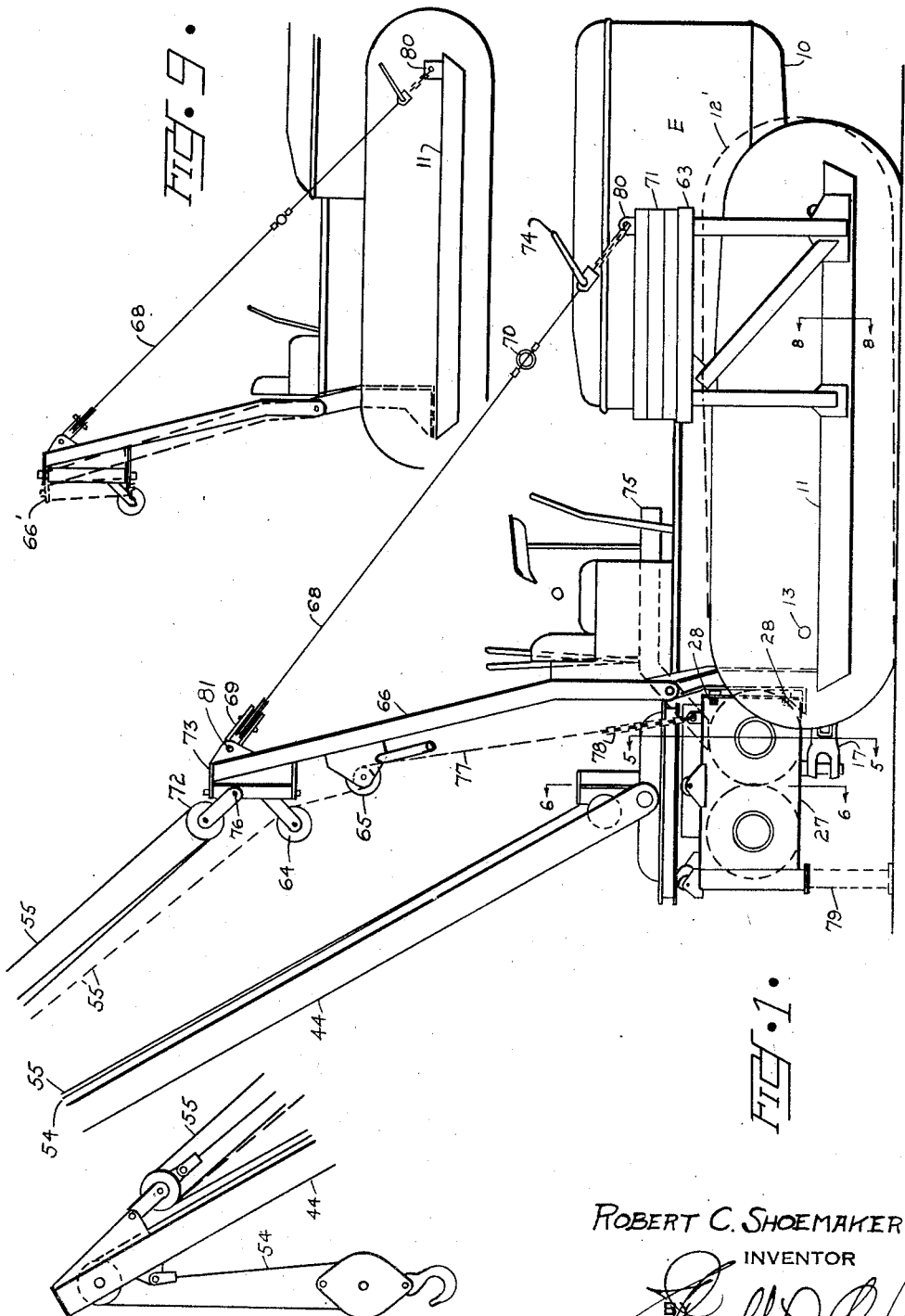
Figures 2, 3:
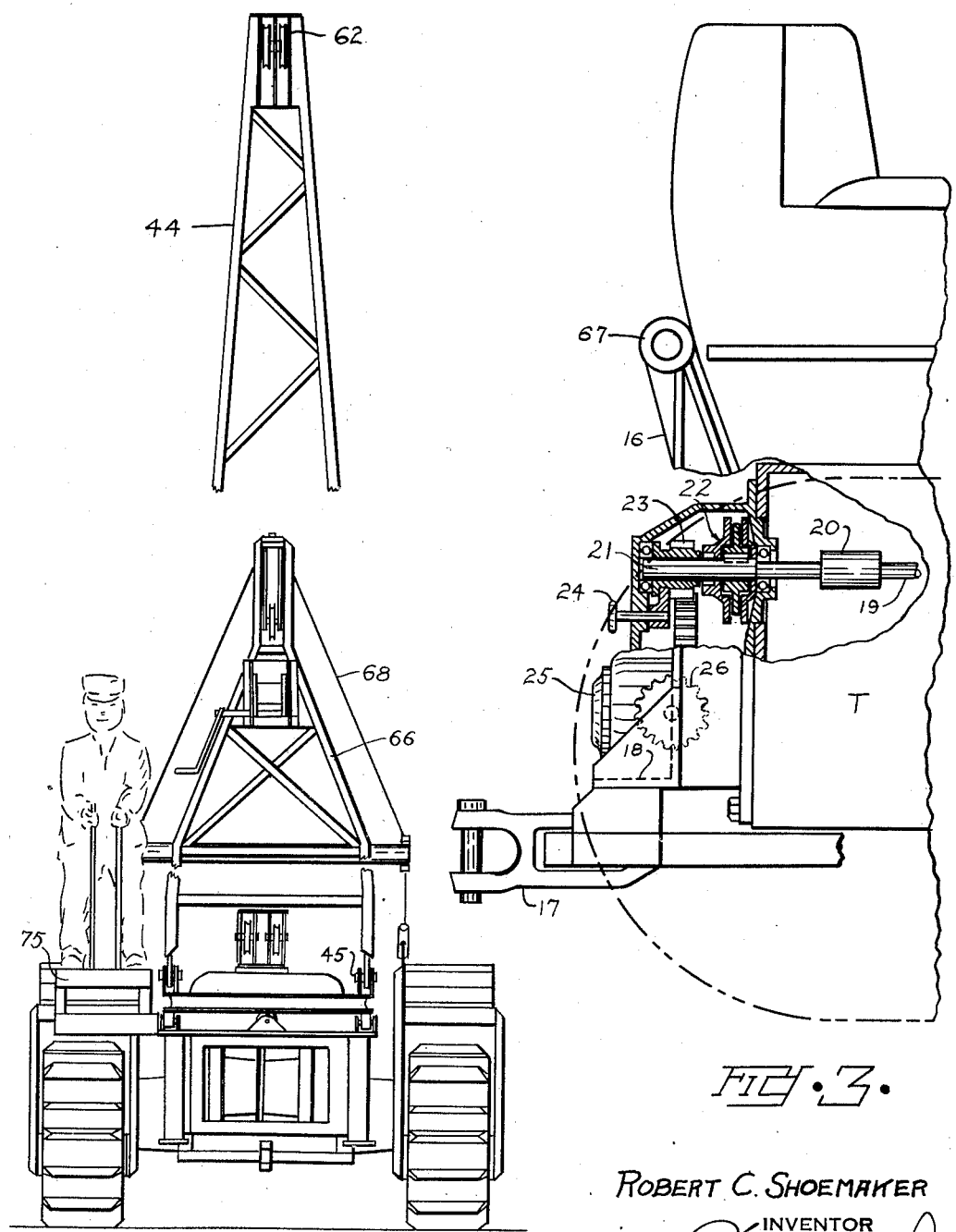
Figure 6:
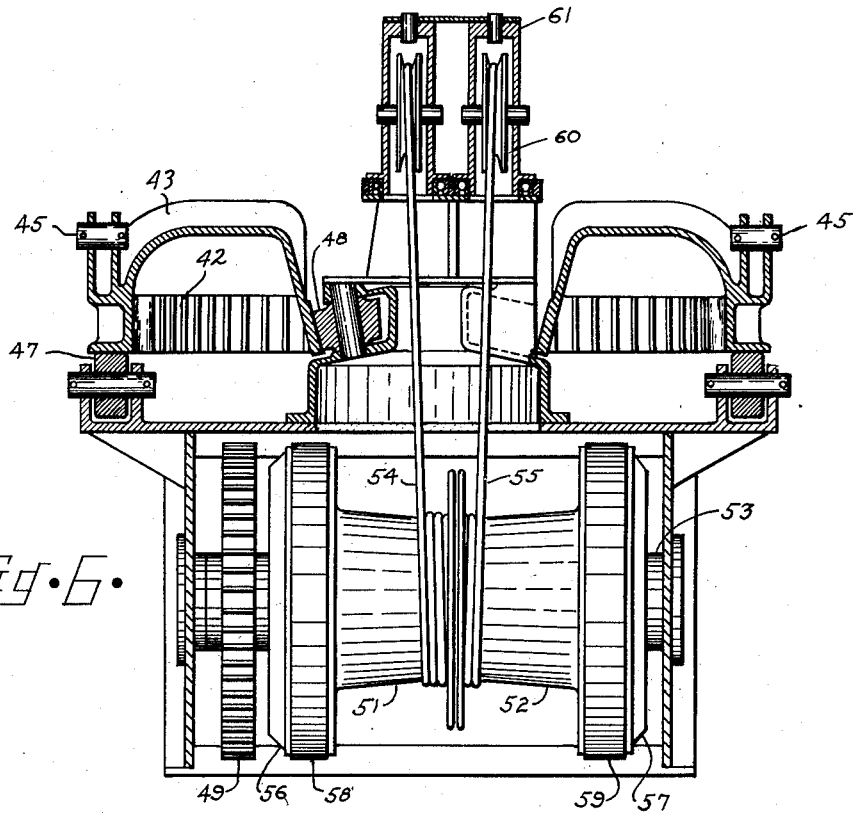
Figure 5:
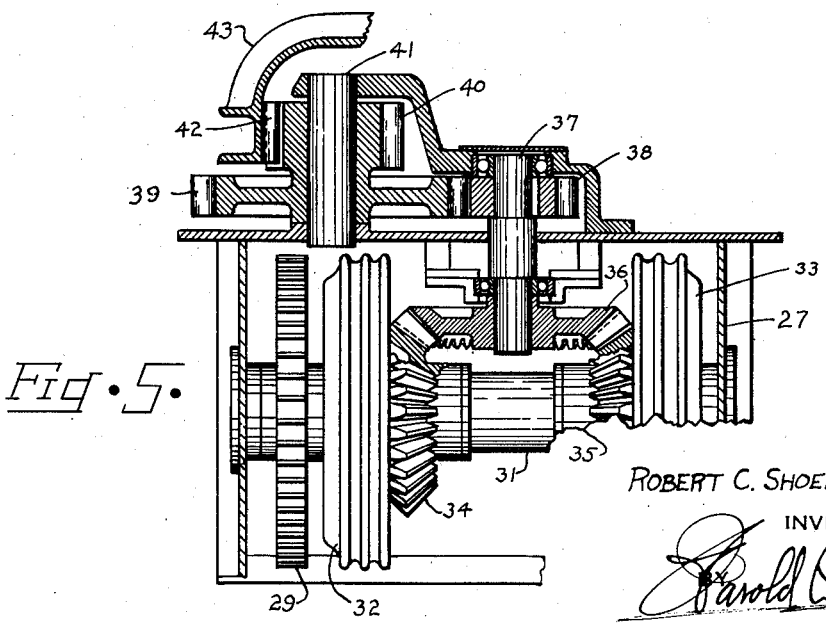

In the drawings: Figure 1 is a side elevation of a conventional spring-suspended track-type tractor having a swing type crane mounted thereon embodying the instant invention; Figure 2 is a rear end elevation of the tractor shown in Figure 1; Figure 3 is a side elevation, partly in section, of the rear end of the tractor, illustrating the power take-off and transmission mechanism for operating the hoist; Figure 4 is an end elevation, on somewhat reduced scale, of the mechanism shown in Figure 3; Figure 5 is a transverse elevation, partly in section, of the mechanism for rotating the crane, taken on the line 5—5 of Figure 1; Figure 6 is a transverse elevation, partly in section, of the mechanism for operating the hoisting drums, taken on the line 6—6 of Figure 1; Figure 7 is a diagrammatic representation of the flexibility of the bridle for the backstay mast; Figure 8 is a transverse elevation of the tractor suspension, taken on the line 8—8 of Figure 1; and Figure 9 is a side elevation of the tractor illustrating a modification of the backstay anchoring mechanism.

Referring to the drawings, there is illustrated a conventional track-type tractor comprising essentially a frame 10 upon which is mounted the engine E and transmission T, and which also supports other auxiliary apparatus including the operator's compartment O. The tractor also comprises a crawler assembly mounted on each side of the frame, each of which includes a track roller frame 11 and tracks 12.

The main body of the tractor is mounted upon a frame 10 flexibly supported upon the crawler assemblies, being rotatably mounted on the rear axle 13 and suspended by a transverse leaf spring 14 mounted upon the crawler frames 11 at a point between the driving sprocket and the front idler roller. The central portion of the spring supports the main body of the tractor, being rigidly attached thereto, the ends of the spring resting in saddles 15 on the crawler frames 11 in which they are free to slide as deflections of the spring cause it to change in length. A load such as might be applied by a boom mounted upon the main body of the tractor creates a tipping stress tending to lift the main body of the tractor off of the spring, and thus reverses the stress for which the spring 14 is designed. It will be appreciated that the construction of a leaf spring is such that extreme deflections take place when the stress on the spring is reversed, and that the main body of the tractor would move through a dangerous angle before the holding-down effect of the heavy crawler assemblies would come into play. Before the crawler assemblies would be lifted from the ground, the spring would be broken or permanently deformed. For these reasons, it has been necessary heretofore, when mounting cranes of the general type herein described upon general utility tractors, to replace the spring 14 with a rigid beam, thereby impairing much of the maneuverability and utility for which tractors are employed.

Referring particularly to Figure 3 and incidentally to Figures 1 and 4, the invention comprises brackets 16 bolted or otherwise secured more or less permanently to the rear end of the transmission housing T. The brackets 16 are so designed that they do not interfere with normal use of the tractor drawbar 17. Steps 18 are provided on the brackets 16 for supporting the hoist mechanism, presently to be described.

Power for operating the crane is derived from the usual power take-off shaft 19 through the medium of coupling 20 and continuously driven shaft 21. The power provided in a tractor built for conventional uses is invariably a great deal more than is required for the relatively light work of operating a crane or shovel, and a friction slip-clutch 22 is provided for limiting the torque delivered to the hoist unit, thereby eliminating the necessity of constructing a unit capable of handling full engine horsepower. Rotatably and slidably mounted on shaft 21 is a pinion 23 which may be caused to engage or disengage the driven element of slip-clutch 22 by means of manually operable control rod 24. Movement of control rod 24 inwardly of the transmission mechanism causes the pinion 23 to engage the driven element of slip-clutch 22 and so transmit power from shaft 21 through conventional gears (not shown) in transmission 25 to pinion 26, through which power is delivered to the hoist mechanism. Movement of the control rod 24 outwardly of the transmission mechanism causes pinion 23 to disengage clutch 22 and so interrupt the transmission of power from shaft 21 to pinion 26.

Referring particularly to Figures 1 and 2, and incidentally to Figures 5 and 6, the hoist mechanism comprises a housing 27 adapted to be detachably mounted on the brackets 16, to which it is attached by a relatively small number of large diameter bolts 28. More particularly, the hoist mechanism comprises a mechanism, illustrated in detail in Figure 5, for rotating the boom and a mechanism, illustrated in detail in Figure 6, for handling the load. When the housing 27 is brought into position on the steps 18 of brackets 16 and fastened thereto with bolts 28, pinion 26 meshes with gear 29, which in turn meshes with gear 49, these gears being keyed to swing shaft 31 and hoist shaft 53, respectively.

Power to drive swing shaft 31 is transmitted from pinion 26 through gear 29 and thence through swing shaft 31 to the driving elements (not shown) of clutches 32 and 33, respectively. Attached to the driven elements of clutches 32 and 33 are bevel pinions 34 and 35, each of which is in mesh with bevel gear 36 keyed to vertical shaft 37. Through the medium of vertical shaft 37 bevel gear 36 drives pinion 38, which in turn drives spur gear 39 and swing pinion 40, these two elements being integrally connected and rotatably mounted on shaft 41. Swing pinion 40 meshes with internal teeth 42 of bull wheel 43 upon which the boom 44 is pivotally mounted by means of heel pins 45. As clutch 32 is engaged by the operator, power is transmitted to bevel gear 36 to rotate shaft 37 and pinion 38 in a counterclockwise direction, thereby causing the boom 44 to swing in the clockwise direction. If, instead, the operator engages clutch 33 (which is interlocked with clutch 32 so that both cannot be engaged simultaneously) power is transmitted to bevel gear 36 through bevel pinion 35; causing gear 36 to rotate shaft 37 and pinion 38 in a clockwise direction, thereby causing the boom 44 to swing in a counterclockwise direction. The bull wheel 43 is rotatably mounted on the housing 27 by means of rim rollers 47 and centering rollers 48 suitably journaled in bearings carried in the framework of housing 27.

The hoist mechanism illustrated in Figure 6 comprises drums 51 and 52 to which are anchored the hoist cable 54 and auxiliary cable 55, respectively. Power to operate the drums 51 and 52 is transmitted from pinion 26 through gear 29 to gear 49 keyed to shaft 53. Also keyed to shaft 53 are the driven elements of clutches 56 and 57 (which can be engaged simultaneously if desired). Engagement of either of the clutches rotates the drum and winds in the cable, and disengagement thereof permits the drum to spool freely or unwind. To hold the cable in any desired stationary position, band brakes 58 and 59 of conventional design are provided.

Cables 54 and 55 run up through the center of the bull wheel 43 and over sheaves 60 of fair leads 61 which are of conventional design. As the boom 44 swings, the sheaves 60 turn therewith in the direction of the boom so that the upper ends of the lines always lead to the tip of the boom, while the lower ends of the lines have their lead unchanged by the swing of the boom and always lead directly from their respective drums 51 and 52. The construction prevents the cables from crowding to one end of the drum when the crane is swung in that direction.

Figure 1 shows the crane rigged for ordinary lifting work, with line 54 operating the hook and line 55 trained through backstay block 72 for suspending the boom. Should it be desired to rig the crane with two power lines running through the tip of the boom, as is the case when operating a clam shell bucket or pile driver, the end of boom suspension line 55 is removed from drum 52 and trained through fair lead 64 to hand drum 65 mounted on the backstay mast 66, as shown in broken line at 55'. Thereupon the drum 52 is fitted with a second power line (not shown) which is trained through a second sheave in the end of the boom, shown at 62 in Figure 2. The rigging is used also when a shovel attachment (not shown) is used instead of a lifting boom.

Pivoted at the top of brackets 16 is backstay mast 66, the mast being secured to the brackets 16 by means of a pin journaled in bearing 67 at the top of each bracket. The mast is guyed to the crawler frames 11 by means of a bridle cable 68 secured to the mast 66 through an equalizer block 69. On uneven ground the crawler assembly on one side of the tractor may move into an elevated position, shown at 12', while the crawler assembly on the other side of the tractor may remain in a lower position. Under such conditions, bridle cable 68 will run through block 69 and thus equalize the load applied to the respective crawler assemblies. A spreader bar 70 is placed in the bridle to eliminate the tendency to pull the crawler assemblies inwardly. During oscillation as described, spreader bar 70 moves to some position shown at 70' in Figure 7.

An important advantage of the construction herein disclosed resides in the fact that the bridle cable 68 is guyed to the crawler frames 11, whereby tipping stress applied by a load on the boom tends to lift the entire front end of the tractor, the spring 14 being loaded in the proper direction. It will be appreciated that the tractor is of sufficient weight to counterbalance the crane for ordinary lifting operations, provision being made for use of counterweights 71 for increasing the load capacity of the crane. In Figure 1 the bridle cable 68 is shown guyed to counterweight frame 63 mounted on the crawler frame 11, whereas in Figure 9 the bridle cable is shown guyed directly to the crawler frame.

It is important that the backstay mast 66 be mounted for rotation about a horizontal pivot on the tractor. It may often happen that, due to the unevenness of the ground over which the tractor is operating, relative movement may be had between the body of the tractor and the crawler assemblies as indicated at 12' in Figure 1. In such event, were the backstay mast 66 rigidly mounted upon the tractor, the bridle cable 68 would tend to become slack and the entire backstay stress applied to the top of the mast would be transferred through the mast to the main body of the tractor. The stresses so applied would tend to tip the body of the tractor in the direction of the load on the crane and so reverse the stress on the spring 14, causing extreme deflection thereof and possible breakage. An advantage of the instant invention resides in the fact that the mast 66 is permitted to rotate about the pins in bearings 67 into some position as shown at 66' so that no slack can develop in the bridle cable 68 and none of the tipping stress of the crane can be transmitted directly to the main body only of the tractor but must lift the entire tractor. Such stress is indirectly transmitted to the tractor body through the tractor spring which, under the conditions described, is stressed in the proper direction.

At the top of the backstay mast 66 is mounted the backstay block 72, as well as fair lead 64 if the boom is to be so rigged, through which is trained boom suspension cable 55. These sheaves are pivoted on vertical pin 73 which forms the upper boom suspension point on the axis of rotation of the boom. Any crane, when lifting a heavy load, has a tendency to lean toward the load, which has the effect of deflecting the axis of rotation so that the boom tends to swing by gravity to its lowest possible position. Such a condition requires an added amount of power to swing the boom from its lowest possible position to any other position in the course of operations. In the construction embodying the instant invention, means is provided for adjusting the length of the bridle cable 68 whereby the upper boom suspension point 73 can be brought to a position in vertical alignment with the lower boom suspension point, which is the center of the bull wheel, and so eliminate the difficulties inherent in swinging the boom against the force of gravity. Such an adjusting means comprises a ratchet type chain hoist 74 attached to one end of the bridle cable 68. An adjusting means is particularly useful under working conditions which require repeated lifts of a given load such as would be the case in operating a clam shell bucket. In such instances, the angular inclination of the axis of rotation of the crane can be determined by the operator and the required adjustment made in the length of the bridle cable to restore the axis of rotation to the vertical.

A further advantage of the construction herein disclosed and described is the ready removability of the crane to permit the use of the tractor for other purposes for which the tractor may be required. To simplify installation and removal, the operator's platform 75 is constructed as an integral part of the housing 27. All levers and handling gear for operating the crane are permanently installed thereon so that when the hoist is removed from the tractor none of this mechanism need be disconnected.

To remove the crane from the tractor the operation is as follows: Lower the boom 44 to a horizontal position, by rotating the boom about the heel pins 45. In this position the boom 44 is supported by the heel pins 45 and the bull wheel 43 so that the boom line 55 may be disconnected from the drum 52 in the hoist unit and placed on the hand drum 65 mounted on the backstay mast 66. When the boom line 55 has been placed on the hand drum 65 the line is tightened to raise the boom a few degrees above horizontal. Jack legs 79 are lowered into supporting position and the bolts 28 which fasten the housing 27 to the brackets 16 are removed. Thereupon, the line 55 is slacked off by releasing the hand drum 65 to lower the boom into contact with the edge of the bull wheel 43. The weight of the boom will cause the housing 27 to rotate about the point where the jack legs 79 contact the ground until such time as the tip of the boom also rests upon the ground. Thereupon, the boom line 55 may be removed from the hand drum 65 and the tractor driven forwardly away from the hoist, leaving the latter supported by a three point support comprising the jack legs 79 and the tip of the boom 44. As the hoist housing 27 moves out of operating position, the gear 29 disengages the power take-off pinion 26.

The backstay mast may then be removed as follows: Reeve auxiliary line 77 from hand drum 65 over sheave 64 and attach it to equalizer block 69. By operating hand drum 65 tighten line 77 enough to permit removal of pin 81, whereupon the backstay mast may be lowered by unwinding the hand drum 65. Bridle 68 may be allowed to engage over the top of tractor seat so that bridle will exert sufficient upward pull on the mast to support it above the ground. After the top end of the mast has come to rest on the ground, pivot pins are removed from bearings 67. The bridle cable 68 may be removed by disconnecting the bridle anchor pins 80. It is intended that the transmission 25 and brackets 16 shall be fixedly secured to the tractor. As has been stated, these are so positioned that they do not interfere with functions employing the use of the drawbar 17.

Having now described my invention and in what manner the same may be used, what I claim as new and desire to protect by Letters Patent is:

1. A tractor comprising a body, a crawler traction unit flexibly mounted on each side of said body, a hoisting unit including a mast mounted for rotation about a horizontal pivot at one end of said tractor, a boom support mounted on said hoisting unit for rotation about a vertical axis, said hoisting unit being adapted for assembly and disassembly relative to said tractor, and a guy cable having its opposite ends attached to the said crawler units remote from said hoisting unit, the intermediate portion of said cable being trained over a pulley at the top of said mast.

2. A tractor comprising a body, a crawler traction unit flexibly mounted on each side of said body, a hoisting unit including a mast mounted for rotation about a horizontal pivot at one end of said tractor, a boom support mounted on said hoisting unit for rotation about a vertical axis, backstay means connecting the upper end of said mast and said crawler units at a point remote from said hoisting unit, and means detachably connecting said mast and said pivot, and also said mast and said backstay means, for permitting assembly and disassembly of said mast relative to said tractor.

3. A tractor comprising a body, a crawler traction unit flexibly mounted on each side of said body, a hoisting unit including a mast mounted for rotation about a horizontal pivot on one end of said tractor, a boom support mounted on said hoisting unit for rotation about a vertical axis, backstay means connecting the upper end of said mast and said crawler units at a point remote from said hoisting unit, and means detachably mounting said hoisting unit on one end of said tractor whereby said hoisting unit is adapted to be readily assembled and disassembled relative to said tractor without disassembly of said unit.

4. A tractor comprising a body, a crawler traction unit flexibly mounted on each side of said body, a hoisting unit including a mast mounted for rotation about a horizontal pivot at one end of said tractor, a boom support mounted on said hoisting unit for rotation about a vertical axis, and backstay means connecting the upper end of said mast and said crawler units at a point remote from said hoisting unit.

5. An attachment for a general utility tractor, comprising a hoisting unit including gearing for operating said hoist and an operator's platform including controls for said gearing, and means detachably mounting said hoisting unit on one end of said tractor whereby said hoisting unit including said operator's platform and controls is adapted to be readily assembled and disassembled relative to said tractor without disassembly of said unit.

6. A tractor comprising a body, a crawler traction unit including a frame flexibly mounted on each side of said body, a hoisting unit including an upright attached to said body at one end thereof, a guy cable having its opposite ends attached to the framework of said crawler units remote from said hoist unit, the intermediate portion of said cable being trained over a pulley at the top of said upright, a spreader bar extending between the end portions of said cable, and counterweights on said crawler unit frames remote from said hoist unit.

7. A tractor comprising a body, crawler traction units flexibly mounted on the opposite sides of said body, a hoisting unit including a mast mounted for rotation about a horizontal pivot at one end of said tractor, a guy cable having its opposite ends attached to the ends of said crawler units remote from said hoist unit, the intermediate portion of said cable being trained over a pulley adjacent the upper end of said mast, and means for adjusting the length of said cable to compensate for the angular inclination of the axis of rotation of the hoist under load.

8. A tractor having a prime mover engine, a power take-off from said engine at one end of said tractor; a hoisting unit removably attached to said end of said tractor, said unit comprising a housing, a boom, a base support for said boom rotatably mounted on the upper part of said housing, and driving gearing in said housing for said support; means for connecting said gearing to said power take-off; a mast pivotally attached to said body adjacent said one end thereof, means for backstaying said mast in the upright position, and means provided on said mast for lifting said hoisting unit relative to said body during the attachment and removal of said hoisting unit.

9. A tractor comprising a body, a crawler type traction unit mounted on each of the opposite sides of said body; a hoisting unit including a cable drum, gearing for said drum and control means for said gearing, said hoisting unit detachably mounted on one end of said body and adapted for assembly and disassembly relative to said tractor; a mast attached to said body for rotation about a horizontal pivot, and means on said mast for lifting said unit relative to said body during attachment and removal of said unit.

10. A tractor having a power take-off at one end thereof including driving gear, a hoist unit detachably mounted on said end of said tractor and adapted for assembly and disassembly relative thereto, said unit comprising a housing, a winch drum journaled on said housing, a boom, a rotatable support for the base of said boom on said housing, driving gearing for said boom support and said drum, said gearing being adapted to operatively engage said driving gear upon attachment of said unit to said tractor.

11. A tractor having crawler assemblies flexibly mounted thereon, a power take-off at one end of said tractor including driving gear, a hoist unit adapted to be detachably mounted on said end of said tractor, said unit comprising a housing, a winch drum journaled on said housing, a boom, a rotatable support for the base of said boom on said housing, driving gearing for said boom support and said drum, said gearing being adapted to operatively engage said driving gear upon attachment of said unit to said tractor, and detachable backstay means interconnecting said boom and said crawler assemblies.

12. A tractor comprising a body having a prime mover engine mounted therein, a power take-off from the said engine at one end of said body, bracket means fixedly mounted on the end of said body adjacent said power take-off, a hoisting unit adapted to be detachably mounted onto said bracket means for assembly and disassembly relative to said tractor and having means adapted to operatively engage said power take-off upon attachment of said unit to said bracket means, said unit including an upright detachably mounted on said bracket means, and means on said upright for lifting said hoisting unit relative to said body during attachment and removal of said hoisting unit.

13. A tractor comprising a body having a prime mover engine mounted therein, a power take-off from the said engine at one end of said body, bracket means fixedly mounted on the end of said body adjacent said power take-off, a hoisting unit detachably mounted on said bracket means for assembly and disassembly relative to said tractor and having means adapted to operatively engage said power take-off upon attachment of said unit to said bracket means.

14. A tractor comprising a body, a prime mover engine in said body, a crawler type traction unit flexibly mounted on each of the opposite sides of said body, a power take-off from said engine adjacent one end of said body, bracket means fixedly attached to said one end of said body, an upright pivotally attached to said bracket means, guying means extending from the top of said upright to the opposite ends of each of said crawler units, a hoisting unit removably attached to said bracket means, said hoisting unit including a winch drum, a gearing for said drum, a boom, a rotatable base support for said boom, driving gearing connected to said base support, and an operator's platform including controls for said gearing.

15. A hoist unit adapted to be detachably mounted on one end of a tractor provided with a power take-off at said end for assembly and disassembly relative thereto, said unit comprising a housing, a boom, a rotatable base support for said boom on said housing, a cable drum journaled in said housing, gearing in said housing for driving said drum and said base support and adapted for engagement with said power take-off upon assembly of said hoist unit relative to said tractor, and an operator's platform secured to said housing including manual controls for said gearing.

16. A hoist unit adapted to be detachably mounted on a tractor having a prime mover engine therein and a power take-off from said engine, said unit including a boom, a cable winch and gearing for operating said boom and said winch from said power take-off, said unit further including an operator's platform having manual control levers for said gearing and mounted thereon in a manner otherwise entirely independent of said tractor.

17. A tractor comprising a body, a prime mover engine in said body, a power take-off from said engine extending to one end of said body, a crawler type traction unit flexibly mounted on each side of said body, said crawler units each including a frame, said means including brackets fixedly attached to said body, an upright mast pivotally and removably attached to said brackets, backstay means extending from the top of said mast to said crawler unit frames, a hoist unit comprising a housing removably mounted on said brackets, a plurality of cable winch drums journaled in said housing, a boom, a rotatable base support for said boom mounted on the upper part of said housing, means for guiding cables from said drums through said base support, gearing in said housing for driving said base support and said winch drums from said power take-off, an operator's platform mounted on said housing, and control means for said gearing on said platform.

18. A tractor comprising a body, a prime mover engine in said body, a power take-off from said engine, a crawler type traction unit flexibly mounted on each side of said body, said crawler units each including a frame, bracket means fixedly attached to said body, an upright mast pivotally and detachably mounted on said bracket means, backstay means extending from the top of said mast to said crawler unit frames, a hoist unit comprising a housing detachably mounted on said brackets, a winch drum journaled in said housing, a boom, a rotatable base support for said boom mounted on the upper part of said housing, means for guiding a cable from said drum through said base support, gearing in said housing for driving said base support and said winch drum from said power take-off, an operator's platform mounted on said housing, and control means for said gearing on said platform.

19. In a swinging derrick, a boom, a rotatable base support for said boom, a flexible base for said rotatable support, a nonrotatable upper boom-suspension anchor in substantially vertical alignment with the axis of rotation of said rotatable base support, said boom-suspension anchor being so disposed as to be susceptible of movement with rsepect to said rotatable base support in response to articulate movement of said flexible base.

20. In a swinging derrick, a tractor body flexibly mounted on a plurality of crawler assemblies, a rotatable boom base structure rigidly mounted on said body, a nonrotatable upper boom-suspension anchor in substantially vertical alignment with the axis of rotation of said rotatable base structure and attached mutually to said tractor body and to said crawler assemblies, said boom-suspension anchor being responsive to relative movement of said crawler assemblies with respect to said body without interference with said relative movement.

21. A tractor comprising a body, traction units mounted on each side of said body, a hoist unit mounted on said body comprising a mast structure mounted for rotation about a horizontal pivot at the rear end of said tractor, a boom support mounted on said hoisting unit for rotation about a vertical axis, backstay means connecting the upper end of said mast and said crawler units at a point remote from said hoisting unit, and means including said backstay means for permitting rotation of said mast about said horizontal pivot to any rear projecting position.

22. A tractor comprising a body, a traction unit mounted on each side of said body, a hoisting unit detachably mounted on one end of said body and adapted for assembly and disassembly relative to said tractor, said hoisting unit including a boom support, a boom mounted for rotation about a horizontal pivot on said support, means detachably securing said hoisting unit to said tractor, jack legs adapted to be brought into supporting relation under the opposite side of said hoisting unit with relation to said tractor, said horizontal pivot being so positioned that in its lowermost position with the outer end of the boom on the ground said boom contacts the edge of said boom support whereby said hoisting unit is rotated about the point of contact of said legs with the ground to facilitate assembly and disassembly of said unit relative to said tractor.

ROBERT C. SHOEMAKER.